US006433883B1

(12) United States Patent
Kajita

(10) Patent No.: US 6,433,883 B1
(45) Date of Patent: *Aug. 13, 2002

(54) IMAGE PROCESSING APPARATUS

(75) Inventor: Koji Kajita, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/443,325

(22) Filed: Nov. 19, 1999

Related U.S. Application Data

(62) Division of application No. 08/681,959, filed on Jul. 30, 1996, now Pat. No. 5,999,708.

(30) Foreign Application Priority Data

Jul. 31, 1995 (JP) .............................. 7-194999

(51) Int. Cl.[7] .............................. G06F 13/38
(52) U.S. Cl. ............... 358/1.14; 358/1.01; 358/1.1; 710/33
(58) Field of Search ............... 358/1.14, 1.01, 358/1.1, 402, 403, 407, 444; 710/33; 345/753; 709/212, 216, 217

(56) References Cited

U.S. PATENT DOCUMENTS

| 4,468,755 | A | | 8/1984 | Iida | 364/900 |
| 4,509,122 | A | | 4/1985 | Agnew et al. | 364/200 |
| 5,220,674 | A | | 6/1993 | Morgan et al. | 395/800 |
| 5,321,520 | A | | 6/1994 | Inga et al. | 358/403 |
| 5,331,547 | A | | 7/1994 | Laszlo | 364/413.01 |
| 5,599,231 | A | | 2/1997 | Hibino et al. | 463/29 |
| 5,727,134 | A | | 3/1998 | Higuchi et al. | 395/101 |
| 5,771,354 | A | * | 6/1998 | Crawford | 395/200.59 |
| 5,953,012 | A | * | 9/1999 | Veghte et al. | 345/356 |
| 5,999,708 | A | * | 12/1999 | Kajita | 395/114 |
| 6,069,706 | A | | 5/2000 | Kajita et al. | 358/1.15 |

FOREIGN PATENT DOCUMENTS

| EP | 0598511 | 5/1994 |
| EP | 0653700 | 5/1995 |
| GB | 2 284 124 A | 5/1995 |
| WO | WO9317379 | 9/1993 |

OTHER PUBLICATIONS

Simpson, Mastering WordPerfect® 5.1 and 5.2 For Windows™, 1993.*
Simpson, *Mastering WordPerfect 5.1 and 5.2 For Windows*, pp. 16–18 and 71–74, 1992.*
Tektronix Phaser 550 Color Laser Printer Specifications sheet, Jan. 8, 1996.*

* cited by examiner

Primary Examiner—Mark Zimmerman
Assistant Examiner—Lance W. Sealey
(74) Attorney, Agent, or Firm—Fitzpatrick, Cella, Harper & Scinto

(57) ABSTRACT

The present invention is to provide an image processing apparatus which comprises connection means for connecting to a computer network to which a plurality of computers are connected and record means for recording and outputting image data sent from the computer through the connection means, the apparatus comprises access means for accessing one of the plurality of computers, selection means for selecting a file to be recorded and output by the record means, from among the files managed by the computer accessed by the access means, and request means for requesting, to the computer accessed by the access means, a sending of the image data in the file selected by the selection means, wherein the record means records and output the image data sent from the computer in accordance with the request means, whereby the image processing apparatus can access the computer which is placed far from that apparatus and output the contents of the computer.

35 Claims, 15 Drawing Sheets

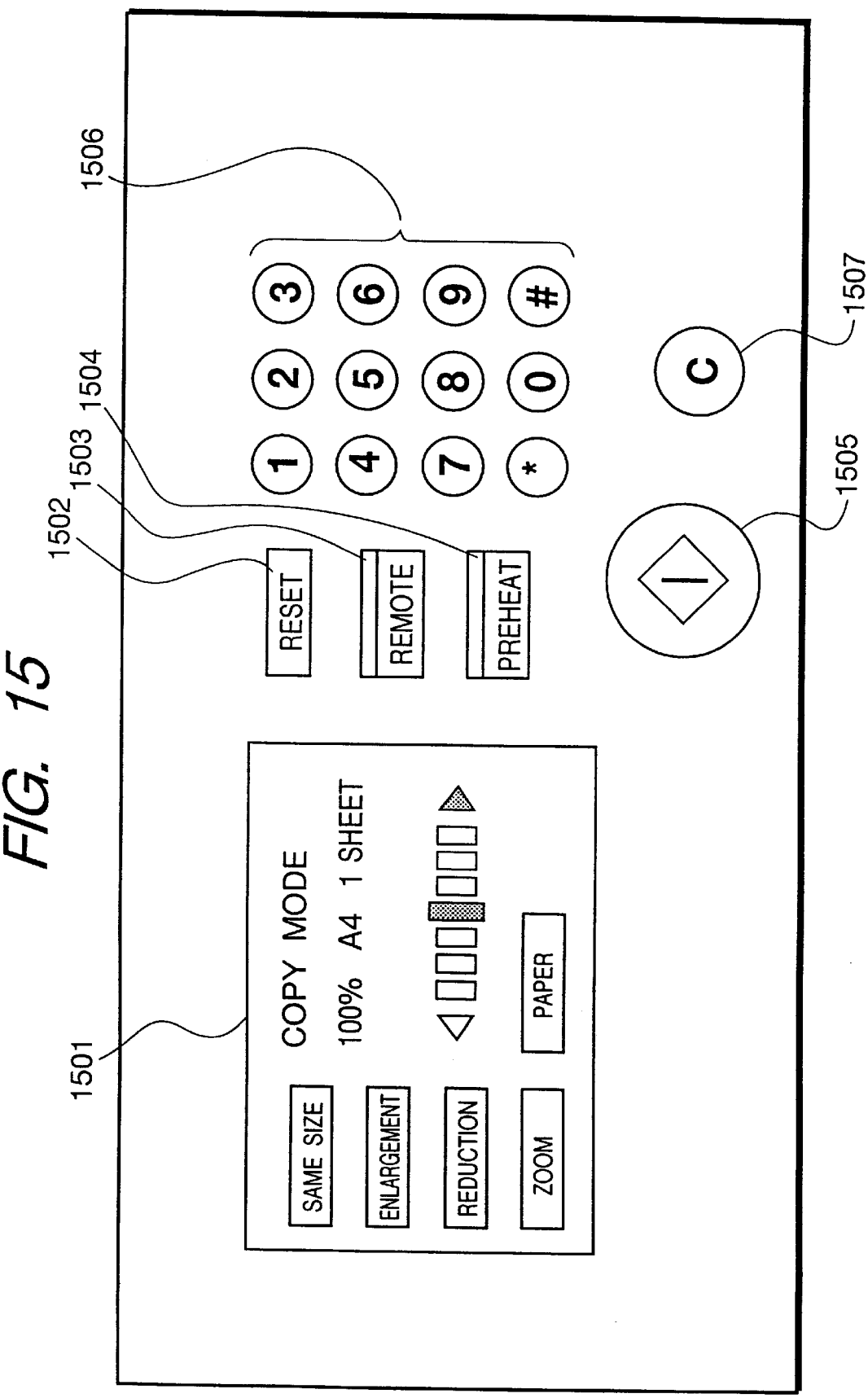

IMAGE PROCESSING APPARATUS

This application is a division of application Ser. No. 08/681,959, filed on Jul. 30, 1996 now U.S. Pat. No. 5,999,708.

BACKGROUND OF THE INVENTION

1. Field of the Invention

The present invention relates to an image processing apparatus for processing image data, and more particularly to an image processing apparatus capable of being connected to a computer.

2. Related Background Art

Conventionally, it has been known as an image processing apparatus of this type an apparatus such as a scanner, a printer or the like which is used as a peripheral apparatus of the computer by being connected to the computer. Further, it has recently been known that, by connecting a digital copy machine to the computer, the scanner and the printer of the digital copy machine are used as peripheral apparatuses of the computer. In this case, the digital copy machine can be used to copy an original image and further can act as the peripheral apparatus of the computer.

The peripheral apparatus functions to operate based on an instruction from the computer. That is, after placing an original on an original support plate, the scanner starts to read the original on the basis of the instruction from the computer, and then read image data is transferred to the computer. Further, when an operator selects a desired file and operates to instruct printing, the printer prints out the image data sent from the computer.

However, in such a system construction co-operated with the computer, the peripheral apparatus can merely act only as a slave apparatus which operates based on the instruction from the computer. Therefore, if there is no instruction from the computer, the peripheral apparatus cannot transfer the read image data to the computer or print the file stored in the computer.

For example, in case of utilizing the scanner, conventionally, an operator sets the original on the scanner, starts the scanner by operating the computer, and then removes the original from the scanner after reading terminates. At that time, there was a problem that, if the scanner is placed far from the computer, the operator must move many times between the scanner and the computer.

Further, for example, in case of utilizing the printer, conventionally, if the operator intends to print the file stored in the computer when he stands nearby the printer, he must go to the computer to operate the file selection, the print instruction or the like, and again returns to the printer to obtain an output document. That is, there was a problem that the operator cannot obtain a desired printed document although he stands nearby the printer.

SUMMARY OF THE INVENTION

An object of the present invention is to provide an image processing apparatus which eliminates the above conventional problems.

Another object of the present invention is to provide an image processing apparatus which can print out image data sent from an external computer in accordance with a request from an image processing apparatus side.

Further another object of the present invention is to provide an image processing apparatus which can operate in a slave mode for outputting image data in accordance with an output instruction from an external computer and in a master mode for outputting the image data sent from the external computer in accordance with a request from an image processing apparatus side.

The above and other objects will become apparent from the following detailed description which is based on the attached drawings.

BRIEF DESCRIPTION OF THE DRAWINGS

FIG. 15 is a view showing an outer configuration of a console unit of the copy machine 1.

DETAILED DESCRIPTION OF THE PREFERRED EMBODIMENTS

Hereinafter, an embodiment of the present invention will be explained in detail with reference to the attached drawings.

Figure 1:
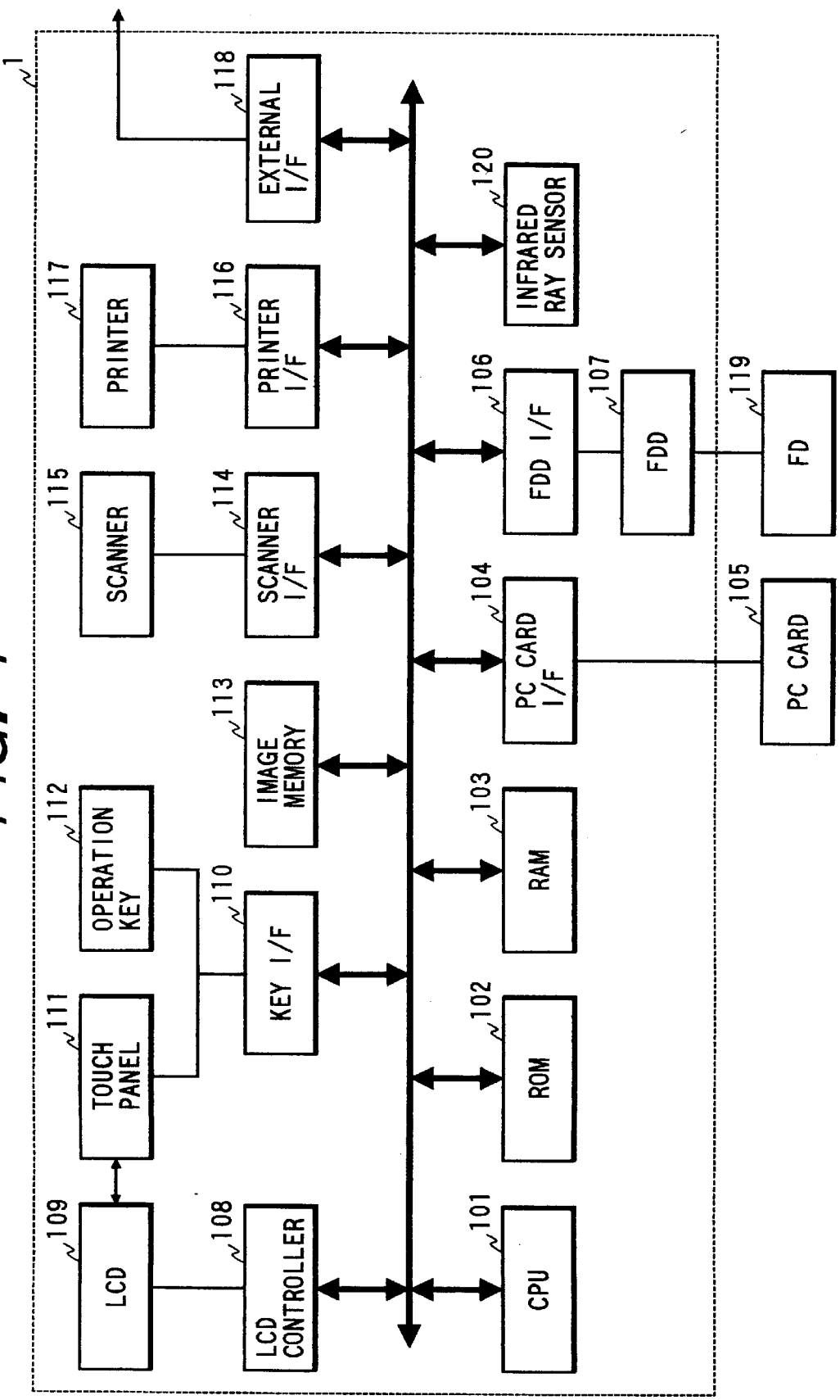
FIG. 1 is a block diagram showing a configuration of a copy machine which is provided in an embodiment of the present invention.

FIG. 1 is a block diagram showing a schematic construction of a digital copy machine according to the embodiment of the present invention.

In FIG. 1, reference numeral 1 denotes a copy machine (main body). The copy machine 1 consists of a central processing unit (CPU) 101, a read-only memory (ROM) 102, a random-access memory (RAM) 103, a PC card interface 104 for connecting a PC card, a detachable PC card 105, a floppy disk drive interface (FDD I/F) 106, a floppy disk drive (FDD) 107, a liquid crystal display (LCD) controller 108, a liquid crystal display (LCD) 109, a key input interface 110, a touch panel 111, an operation key 112, an image memory 113, a scanner interface 114, a scanner 115, a printer interface 116, a printer 117, an external interface 118, a floppy disk (FD) 119, and an infrared ray sensor 120.

The CPU 101 controls the apparatus as a whole in accordance with programs stored in the ROM 102, the RAM 103, the PC card 105 and the like. The ROM 102 constantly stores an execution program used for the control by the CPU 101 and various parameters, and consists of, e.g., a flash ROM or the like. If it is necessary to update the program or the like stored in the ROM 102, the ROM 102 can easily be updated at any time by writing thereinto updated data obtained from the mounted PC card 105, the floppy disk 119 or an external host computer via the external interface 118. The RAM 103 temporarily stores the program and data necessary for executing the program. The PC card interface 104 acts as an interface to be used for accessing the detachable PC card 105 from the CPU 101. The floppy disk drive interface 106 can read data stored in the floppy disk 119 inserted into the floppy disk drive 107 and newly write data into the floppy disk 119, by driving the floppy disk drive 107. The LCD controller 108 displays a character, a drawing and the like on the LCD 109, by receiving from the CPU 101 the data to be displayed. The touch panel 111 which is a pressure-sensitive transparent switch is mounted on the LCD 109 to detect a depression operation by a user. The key input interface 110 is used to read states of the touch panel 111 and the operation key 112. By combining the LCD 109 and the touch panel 111 with each other, an operation image plane can appropriately be changed according to various situations, whereby an operation unit or a console unit which is easy to be used by the user can be provided. The image memory 113 stores image data to be input/output by the scanner 115 and the printer 117. The scanner 115 and the printer 117 manage a command and the image data via the scanner interface 114 and the printer interface 116, respectively. The scanner 115 reads an original image by scanning an original placed on an original support plate. The printer 117 prints out the image data which is received via the external interface 118. Further, the printer 117 prints out the image read by the scanner 115, thereby copying the original. The external interface 118 is an interface to be used for communicating to one or plural computers, e.g., a personal computer, a work station and/or the like, which are placed outside the copy machine 1. The infrared ray sensor 120 is a sensor to be used for detecting whether or not an operator stands nearby the operation unit (the LCD 109, the touch panel 111 and the operation key 112) of the copy machine 1.

Figure 2:
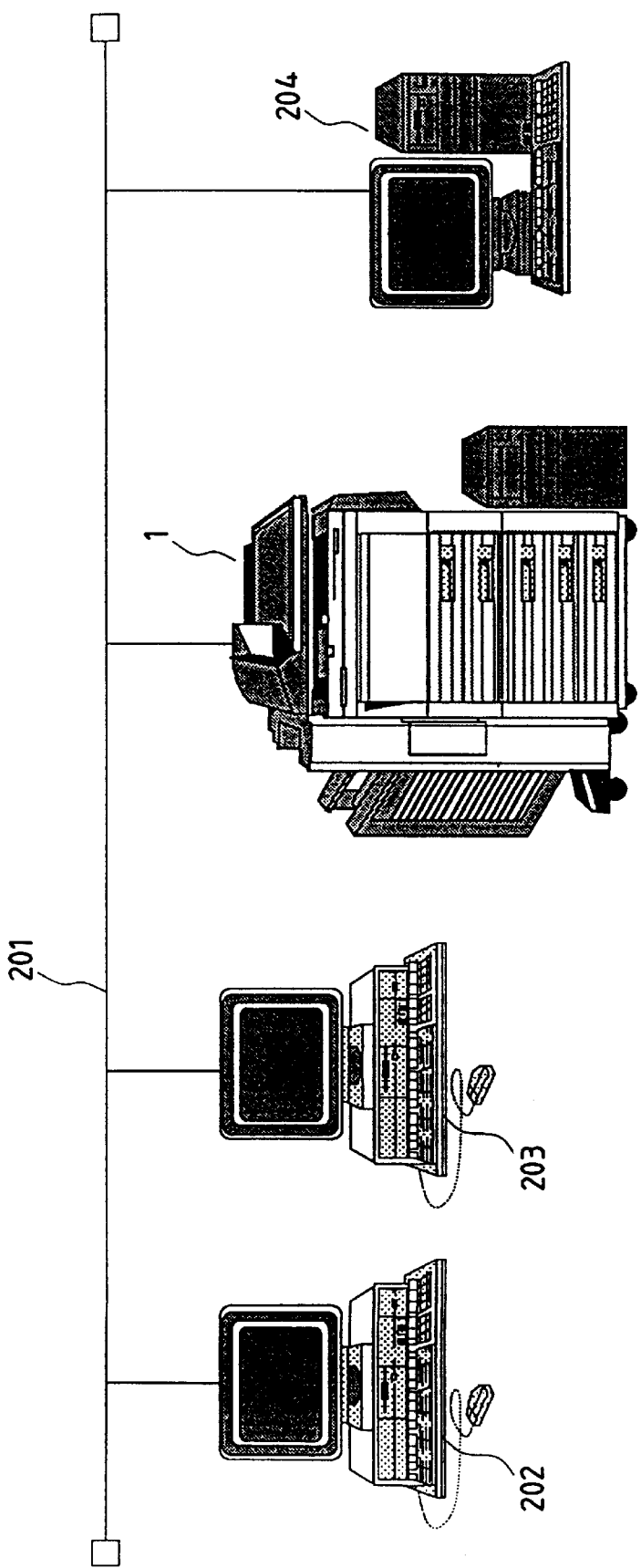
FIG. 2 is a view showing an example in which the copy machine 1 in FIG. 1 is connected to other apparatus.

FIG. 2 shows an example of the configuration in a case where the copy machine 1 in FIG. 1 is connected to a local area network (LAN). The copy machine 1 can act as a well-known digital copy machine such as a local copier and further send/receive the data to/from other devices in the LAN.

In FIG. 2, reference numeral 201 denotes a LAN 201 which forms a network to which a plurality of computers, copy machines, facsimile machines, scanners, printers and the like are connected and in which data sending and receiving are performed among these devices.

Reference numerals 202, 203 and 204 denote personal computers which are connected to the LAN 201. However, computers which can be connected to the LAN 201 are not limited to these three computers 202, 203 and 204, but various computers can also be connected to the LAN 201.

Figure 3:
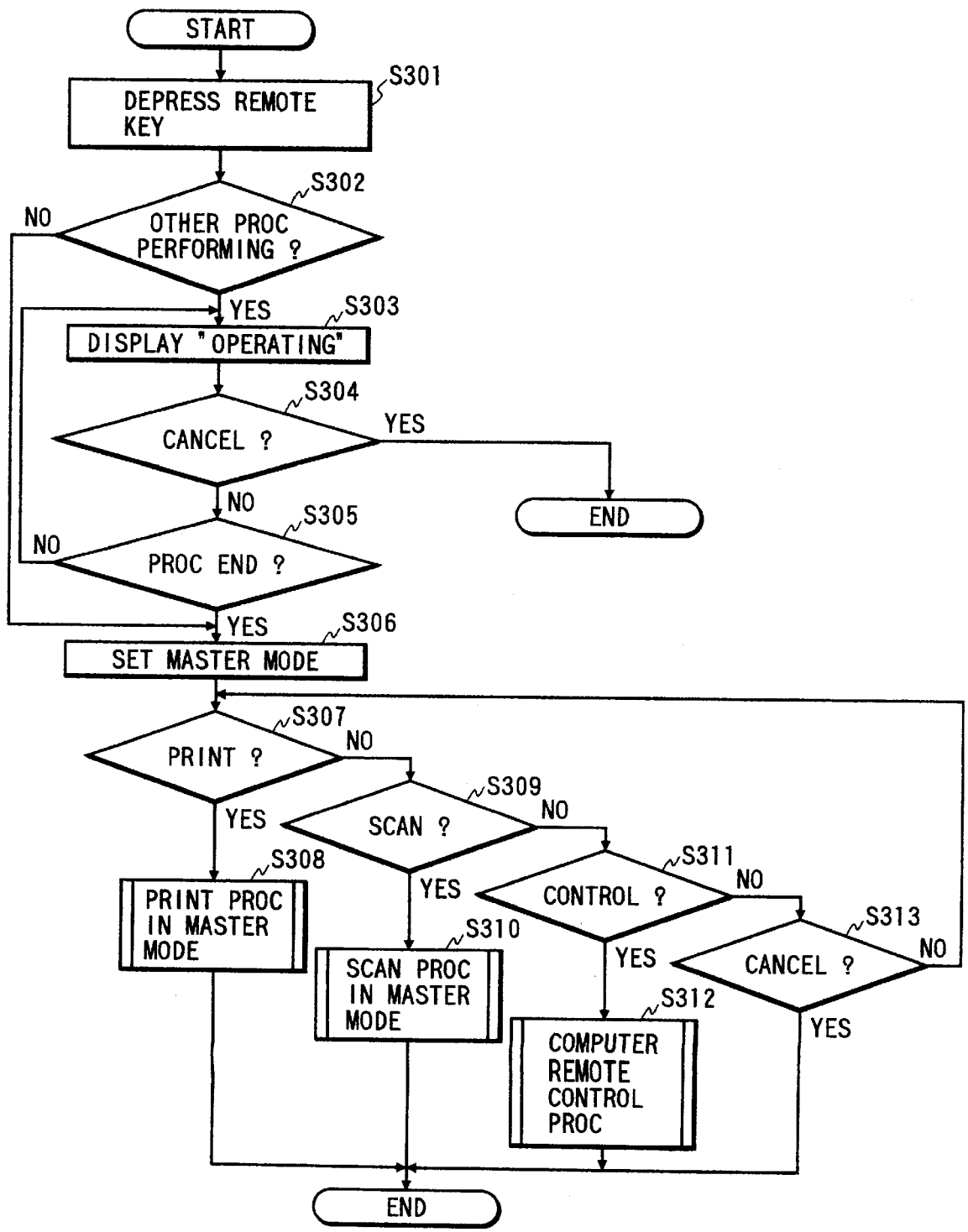
FIG. 3 is a flow chart showing a process by the copy machine 1 in FIG. 1.

A process in case of accessing the external computer from the copy machine 1 will then be explained on the basis of a flow chart shown in FIG. 3. This flow chart is executed based on a program stored in the ROM 102. However, this flow chart can also be executed based on a program which is read from the PC card 105 or the floppy disk 119, or is sent via the external interface 118. It should be noted that the copy machine 1 has a slave mode and a master mode. In the slave mode, the copy machine 1 operates based on an instruction from the external computer. In the master mode, the computer is accessed from the operation key 112 of the copy machine 1, so that the copy machine 1 prints out a file stored in the computer by using the printer 117, and transfers data read by the scanner 115 to the computer.

Further, in the slave mode, the printer 117 is operated in response to a print order from the external computer to print out image data sent from the external computer, and the scanner 115 is operated in response to a scan start order for reading operation sent from the computer to read an image of an original and then to transfer the read image data to the computer. On the other hand, in the master mode, the copy machine 1 specifies or accesses the computer by depressing a remote key of the operation key 112 and then starts a process. This process will be explained in detail, hereinafter.

In FIG. 3, when the remote key is depressed in a step S301, it is judged in a step S302 whether or not another process is being performed. If the another process is being performed, the flow advances to a step S303. In the step S303, the LCD 109 displays that the another process is being performed, to notify the operator that, in such a state, a different process in the master mode cannot start. Then, in a step S304, it is displayed to inquire the operator whether or not the remote key depression should be cancelled. If a cancel is selected by the touch panel 111, the display state of the LCD 109 returns to an initial state. If the cancel is not selected, in a step S305, a stand-by state starts and is maintained until the another process presently performed terminates. When it is judged that the presently-performed another process terminates (in this case an alarm sound is generated), or if it is judged in the step S302 that the another process is not being performed, the displaying of the LCD 109 that the another process is being performed or the displaying of the LCD 109 indicating the initial state is switched to the displaying shown in FIG. 4, in order to set the master mode in a step S306.

Figure 4:
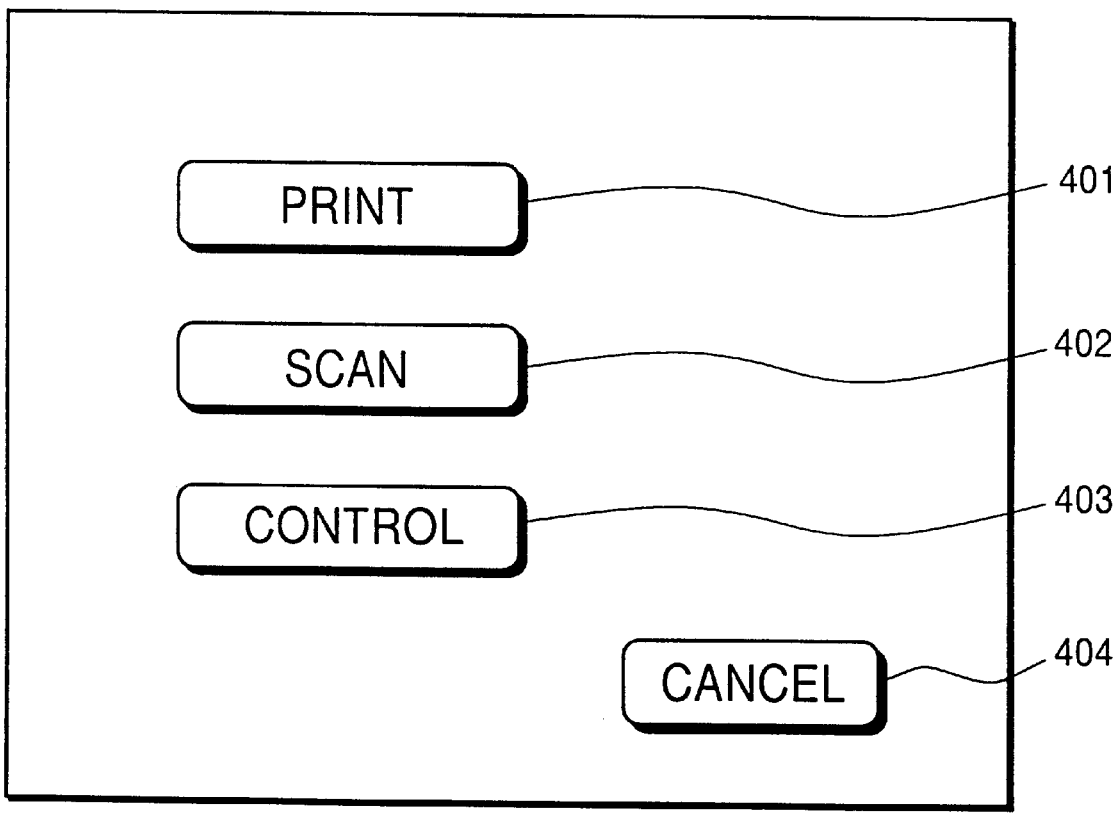
FIG. 4 is a view showing a display image plane which is used for selecting the process.

In FIG. 4, a print button 401 is used for performing a print process in the master mode, a scan button 402 is used for performing a scan process in the master mode, a control button 403 is used for performing a remote control process of the computer, and a cancel button 404 is used for cancelling the process in the master mode. By depressing respective positions at which the buttons are displayed on the LCD 109, coordinates of pixels on the touch panel 111 are detected, and then it is judged by the CPU 101 via the key interface 110 which position of the button is depressed.

If it is judged in a step S307 that the print button is depressed, the flow advances to a step S308 to perform the print process in the master mode. If it is judged in a step S309 that the scan button 402 is depressed, the flow advances to a step S310 to perform the scan process in the master mode. If it is judged in a step S311 that the control button 403 is depressed, the flow advances to a step S312 to perform the remote control process of the computer. If it is judged in a step S313 that the cancel button 404 is depressed, the master mode is cancelled and the displaying of the LCD 109 returns-to the initial state.

Then, the process in a case where the print button 401 is depressed in the step S307 of FIG. 3 will be explained hereinafter on the basis of the flow charts shown in FIGS. 5 and 6.

Figure 7:
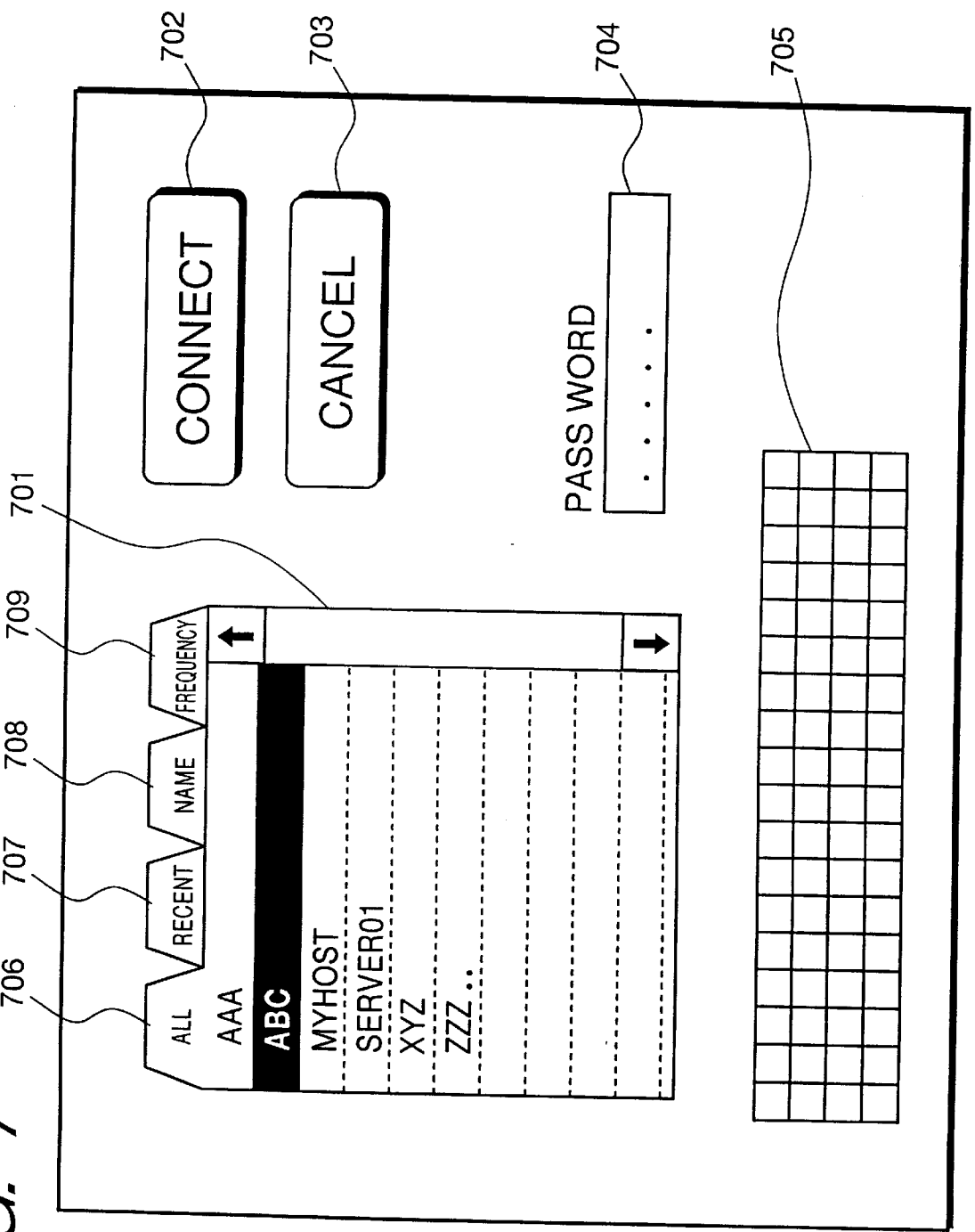
FIG. 7 is a view showing a display image plane which is used for selecting a computer.

When the print button 401 is depressed in the step S307 of FIG. 3, the displaying of the LCD 109 is changed to that shown in FIG. 7.

In FIG. 7, a list 701 shows a list of the computers connected to the LAN 201, a connection button 702 is used to start an access to the computer, a cancel button 703 is used to cancel the print process, a password display column 704 shows an input password, a character palette 705 is used to input a character and the like, a tab 706 is used to display all of the accessible computers, a tab 707 is used to display the computer which has most-recently been accessed, a tab 708 is used to display the computers which had previously been accessed, in the order of name (i.e., in the order of smaller code number), and a tab 709 is used to display the computers which are frequently or often accessed.

When the print button 401 is depressed in the step S307 of FIG. 3, the CPU 101 forms the list of registered names of the computers accessible by inquiring a predetermined computer (e.g., a server or the like) connected to the LAN 201 via the external interface 118, and then displays as the list 701 of FIG. 7 in a step S501. This displaying corresponds to a state where the tab 707 for displaying all of accessible host computers is being selected. Then, in a step S502, the position at which the desired computer is displayed in the list 701 is depressed to select the desired computer. In this case, a name of the selected computer ("ABC" in FIG. 7) is inverse displayed. Then, in a step S503, a password corresponding to the computer selected in the step S502 is input by means of a character list of the character palette 705. The input password is displayed on the password display column 704 in a form of invisible character (or turned letter), so that an input operation can be confirmed. If an erroneous character is input when inputting the password, the input erroneous character can be deleted in unit of character by depressing a deletion key included in the character palette 705. In the above operation, the order of computer selection and password input may arbitrarily set.

When both the computer selection and the password input terminate, in a step S504, the CPU 101 communicates with the selected computer on the basis of a network address in the LAN 201 by depressing the connection button 702, to confirm the password. Then, it is judged in a step S505 whether or not the input password coincides with a registered password, i.e., whether or not the input password is correct or not. If it is judged in the step S505 that the input password is correct, the selected computer can be accessed and the connection is established. Thereafter, the flow advances to a step S507. On the other hand, if the input password does not coincide with the registered password whereby it is judged that the input password is not correct, an error display is performed in a step S506, and the flow returns to the step S501. If the connection is established, information relating to the computer to which the connection is established is stored in a certain area, in the step S507. That is, the information relating to a name of the connected computer, a time when the access is performed, the number of previously-accessed times and the like is stored. Preferably, a storage media to which the information is stored is the RAM 103. However, a partial area of the RM 102, the PC card 105 or the floppy disk 119 can also be used as the storage media.

As mentioned above, it has been explained the case where a destination to which the connection is performed is selected from among all of the connectable computers. However, it will be explained hereinafter a case where the destination to be connected is selected from among the computers to which the connection had previously been performed.

Figure 14:
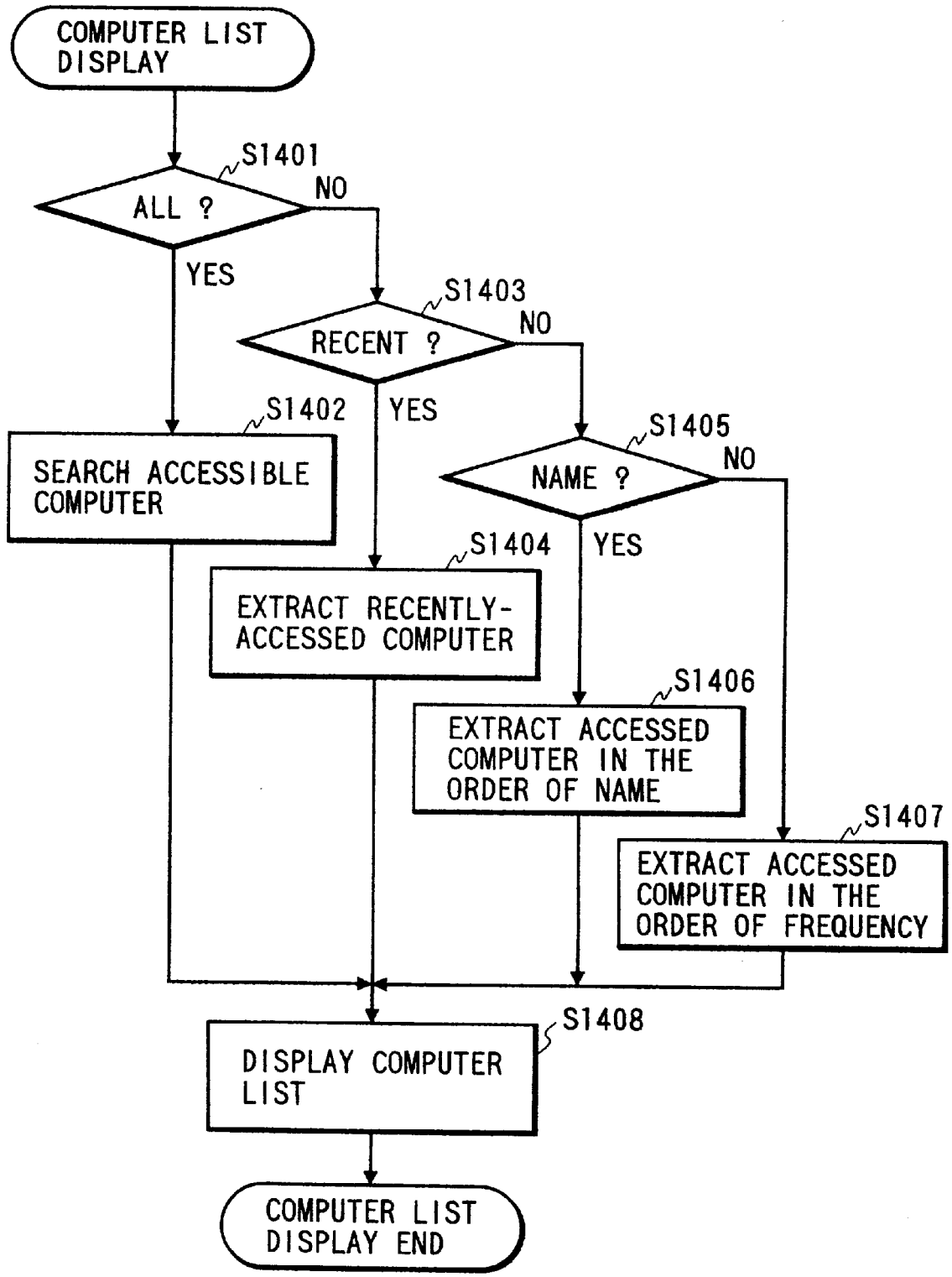
FIG. 14 is a flow chart showing a selection process of a host computer in the master mode of the copy machine 1.

In the present embodiment, a display mode of the computer is changed by selecting the tabs 706, 707, 708 and 709 in accordance with a flow shown in FIG. 14. That is, if the tab 706 showing all of the accessible computers is being selected in a step S1401, the computers connected via the external interface 118 are searched in a step S1402, and then the list of the accessible computers is formed and displayed in a step S1408. If the tab 707 showing the most recently-accessed computer is being selected in a step S1403, the information relating to the previously-accessed computers is searched so that the computers are sequentially listed in the most recently-accessed order in a step S1404. Then, the formed list is displayed in the step S1408. If the tab 708 showing the previously-accessed computers (or showing the computers which have previously-accessed experience) in the order of name is being selected in a step S1405, it is formed in a step S1406 the list in which names of the previously-accessed computers are arranged in the order of name (i.e., the order of code), and then the formed list is displayed in the step S1408. If the tab 709 showing the frequently-accessed or often-accessed computers is being selected, it is formed in a step S1407 the list in which the previously-accessed computers are listed in the order of higher frequency, and then the formed list is displayed in the step S1408. According to the above operation, from among all of the accessible computers or the previously-accessed computers, the computer lists can be shown under a desired condition on the basis of a user's instruction and then the user can select the desired computer.

Figure 8:
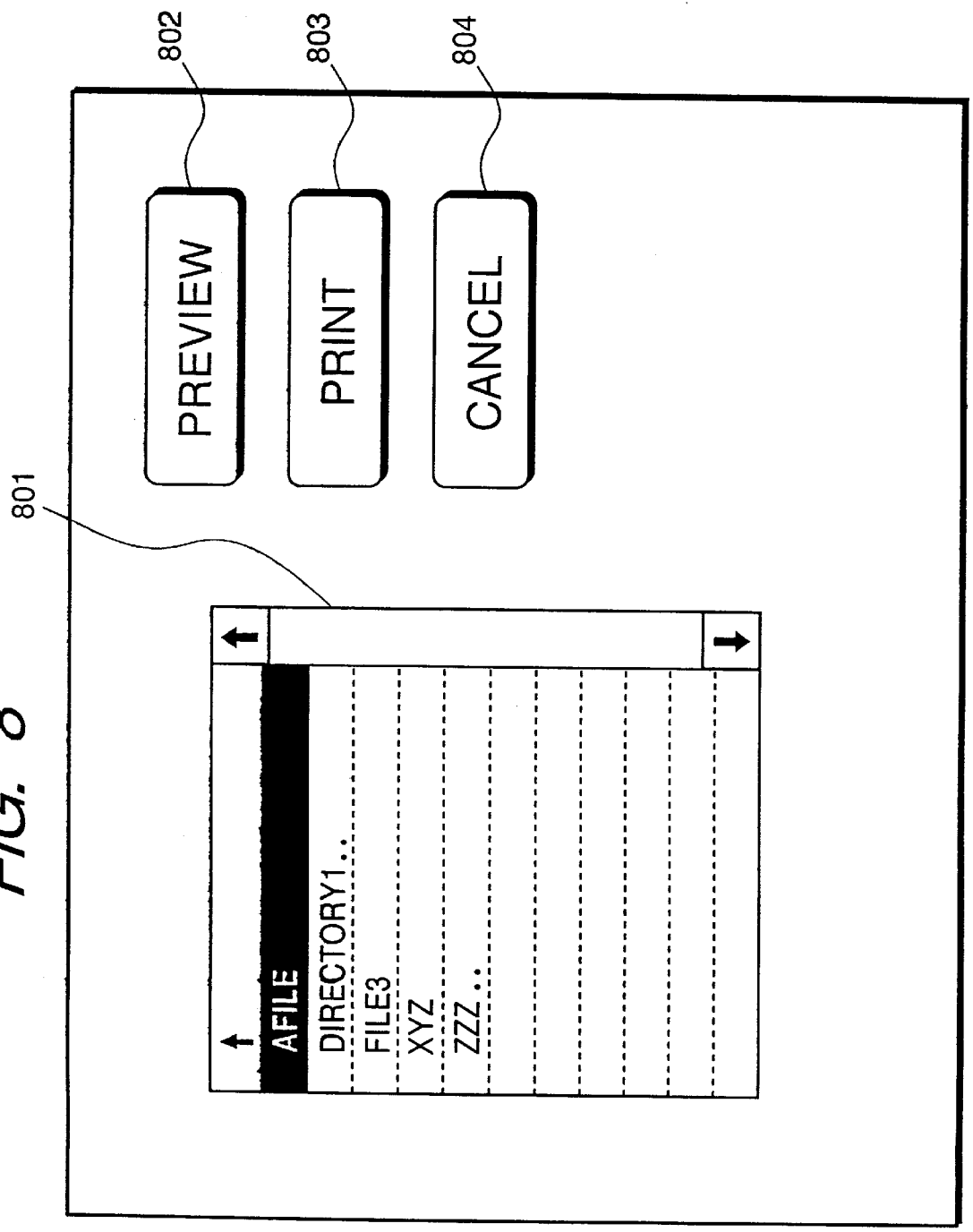
FIG. 8 is a view showing a display image plane which is used for selecting a file.

When the selected computer is accessed according to the above procedure to establish the connection, the displaying of the LCD 109 is changed to that shown in FIG. 8.

In FIG. 8, a list 801 shows files which are managed by the selected computer, a preview button 802 is used to display an image of the selected file, a print button 803 is used to print out the image of the selected file, and a cancel button 804 is used to return a present image plane to the image plane used for computer selection shown in FIG. 7.

Figure 5:
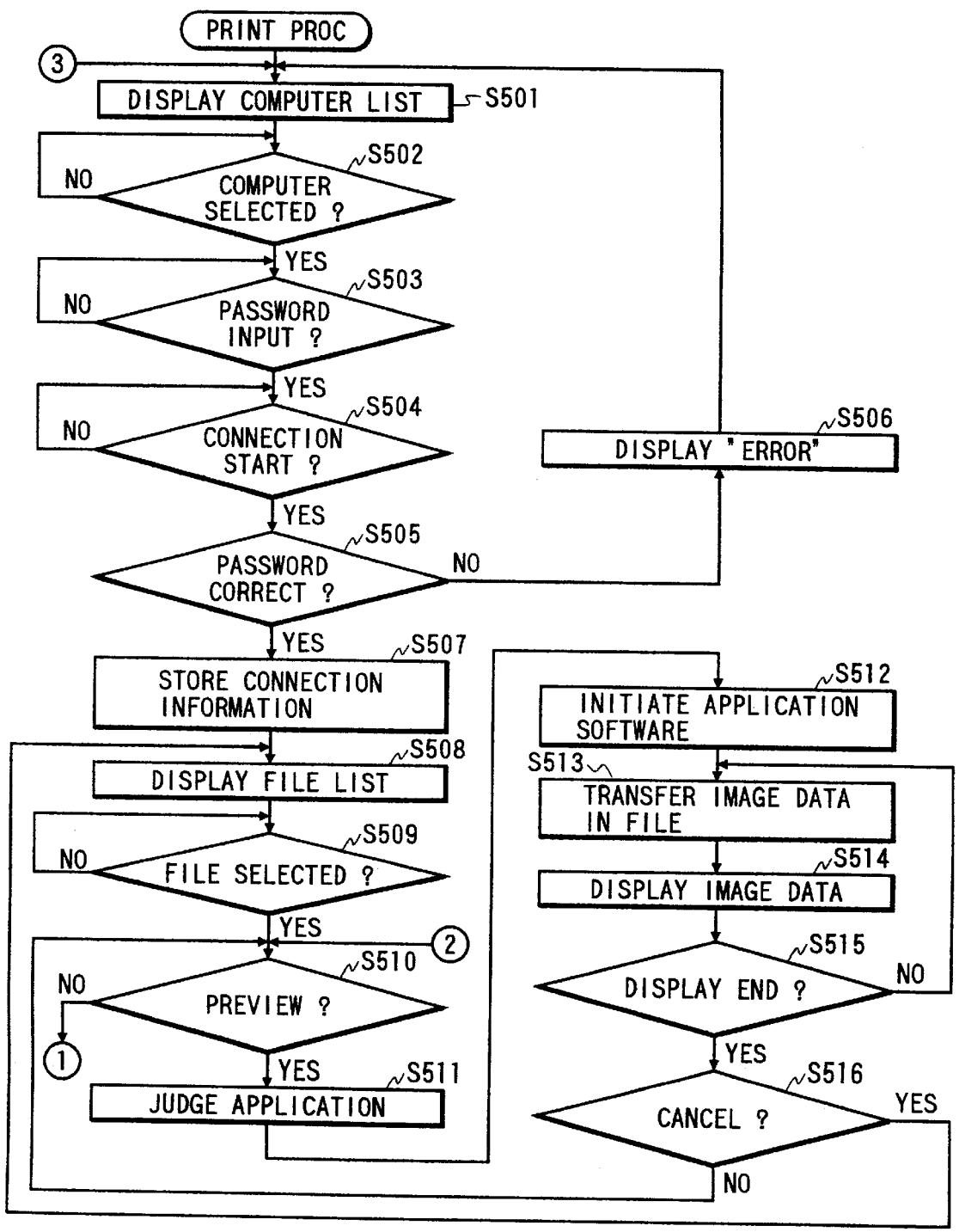
FIG. 5 is a flow chart showing a print process in a master mode of the copy machine 1.
Figure 6:
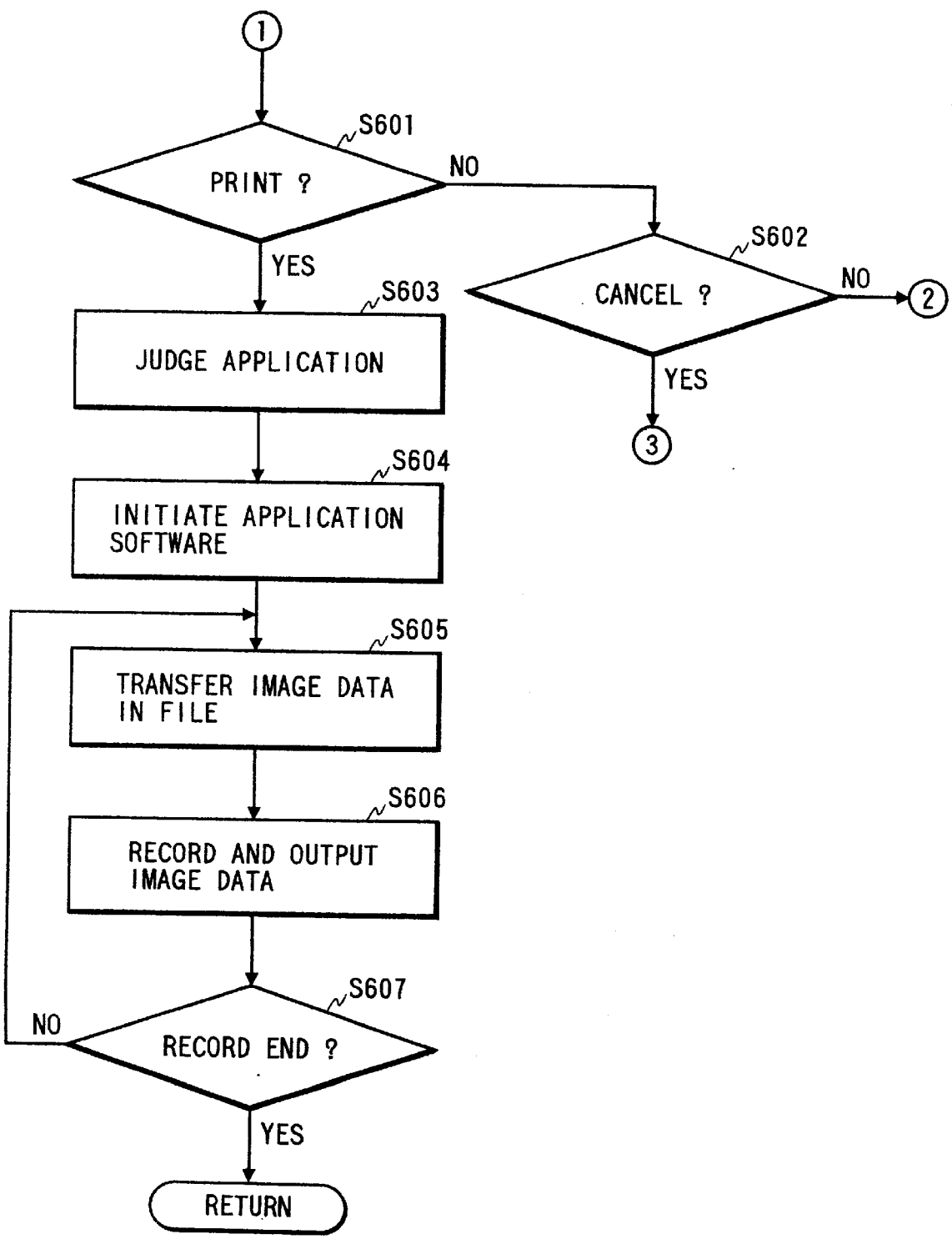
FIG. 6 is a flow chart showing the print process in the master mode of the copy machine 1.

In a step S508 of FIG. 5, the file list is displayed as shown in the list 801 of FIG. 8. If the list does not exist in a directory including an objective file, the directory can be shifted by selecting a sub-directory (marked as ". . ." in FIG. 8) or an upper directory (marked as "↑" in FIG. 8).

When a position of the desired file in the file list is depressed in a step S509, a name of the depressed file is reverse displayed and the file is selected. When the file is selected, it is judged in a step S510 whether or not the preview button 802 is depressed. When depressed, in a step S511, the accessed computer is instructed to discriminate an application software which is used to form that file, on the basis of the selected file name. Further, in a step S512, the discriminated application software starts, and the data in the selected file is read out as bit map data. Then, in a step S513, the image data in the bit-mapped desired file is transferred, and the transferred image data is displayed on the LCD 109 in a step S514. In this case, an upper portion of first page is initially displayed, then a following portions are sequentially displayed in response to operations of a scroll key, a next page key, an entire display key (i.e., used for displaying a compressed one page) and the like (not shown). When the displaying terminates in a step S515, the flow waits for a next key input. When a cancel key (not shown) is depressed in a step S516, the flow returns to the step S508 to display the file list. If the cancel key is not depressed, the flow again waits for the depression of any one of the preview button 802, the print button 803 and the cancel button 804. Then, if it is judged in a step S601 that the print button is depressed, high-resolution image data for printing the selected file is transferred in steps S603 to S605 according to the same procedure as that shown in the steps S511 to S513. The transferred image data is printed out by the printer 117 in a step S606. It should be noted that the image data transferred in the step S513 or S605 is resolution converted if necessary.

On the other hand, if it is judged in the step S602 that the cancel button 804 is depressed, the flow returns to the step S501 to display the computer list.

Figure 9:
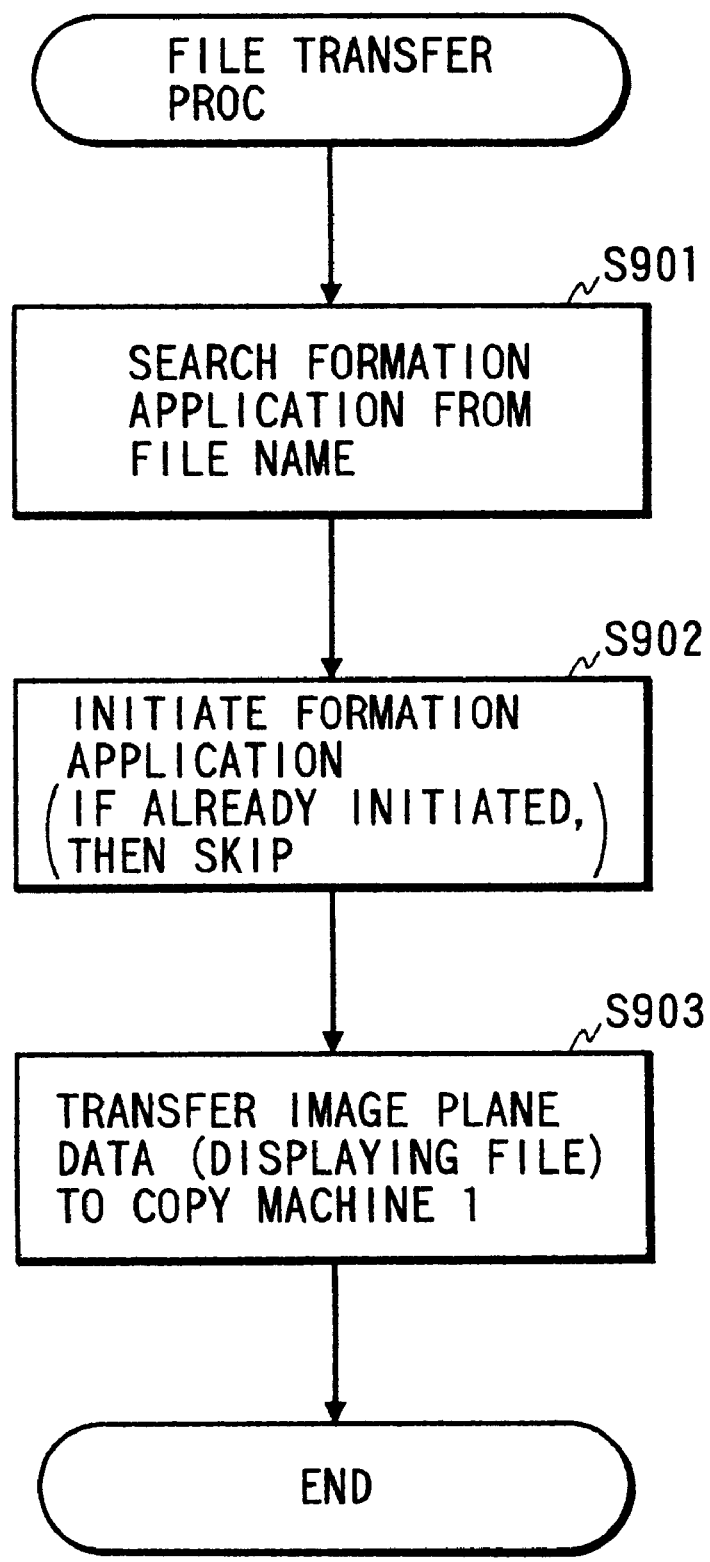
FIG. 9 is a flow chart showing a file transfer process at a computer side.

FIG. 9 is a flow chart showing an execution sequence at a computer side on the LAN 201. This execution sequence relates to the file transferring based on the instructions from the copy machine 1 in the steps S501 to S513 and the steps S603 to S605. If there are the instructions as in the steps S511 and S603, it is checked in a step S901 which application software is used to form the designated file, by referring the file held at the computer side and a data base corresponding to the application software used for forming the held file. Then, in a step S902, if the application software does not yet start the application software starts to read the designated file. Thereafter, in a step S903, the displayed image plane, e.g., window contents of a word processor, is obtained to generate data for the printing, and the generated data is transferred to the copy machine 1.

According to the above operation, a copy machine 1 side can obtain data of the image plane relating to the file contents displayed on the computer. Thus, even if the computer side has the file of any form, the copy machine 1 side receives the bit-mapped data, whereby the displaying and the printing of the received data can be performed at the copy machine 1 side.

It will be explained hereinafter a case where the user explicitly releases the accessing.

As explained above, since the operation can be returned to the one-previous operation by depressing the cancel button in each operation image plane, it is possible as one method to release the accessing by repeating the same operation. On the other hand, in the present invention, there is provided as the other (more easy) method a key for releasing the accessing.

FIG. 15 is a view showing an outer configuration of a console unit (including the LCD 109, the touch panel 111 and the operation key 112) of the copy machine 1 of the present invention. In FIG. 15, reference numeral 1501 denotes a display unit consisting of the LCD 109 and the touch panel 111, reference numeral 1502 denotes a reset key, reference numeral 1503 denotes a remote key (previously explained), reference numeral 1504 denotes a preheat key, reference numeral 1505 denotes a start key, reference numeral 1506 denotes a ten key and reference numeral 1507 denotes a stop key. It should be noted that these keys are hard keys which together construct the operation key 112. Each of the remote key 1503 and the preheat key 1504 has, at its upper portion, an LED display unit to show a presently-set operation mode.

The display unit 1501 displays an operation panel for the user in accordance with the above-mentioned various cases, to accept the user's key input. The reset key 1502 is a key which is used to return all of the presently-set various setting states to the initial setting state.

In the state where the computer is being accessed via the external interface 118 by depressing the remote key 1503, the CPU 101 turns on an LED of the remote key 1503. Therefore, the user can easily recognize that a computer access mode is being set. In the computer access mode, if the user wishes to release the accessing, he can obtain the same effect by using several keys in addition to the sequential depressing of the cancel key. That is, when the reset key 1502 is depressed, it is meant by this depressing that the user indicates to return the setting mode to the initial state. Therefore, the CPU 101 terminates the communication with the computer and returns the display unit 1501 to the initial image plane. When the preheat key 1504 is depressed, the copy machine 1 turns off a main power source to come to be in a preheat mode. In the preheat mode, to hold the computer accessing is meaningless, so that the accessing is similarly released and then the copy machine 1 comes to be in the preheat mode. When the remote key 1503 is again depressed in a state where the LED of the remote key 1503 is being turned on, it is meant by this depressing that the user indicates to access an other new computer. Therefore, the CPU 101 releases the accessing for the computer presently accessed.

As explained above, since the accessing can directly be released based on the instruction from the operation key 112, the user can immediately release the accessing if necessary.

Then, in a case where a standby state of the copy machine 1 continues for a predetermined period of time because the user does not operate the copy machine 1 for a long period of time, i.e., in a case where a setting mode reset timer or a preheat timer operates, if it is maintained the state that the computer is being accessed, the CPU 101 releases the accessing without any instruction by the user and operates to come to be in a mode reset state or in the preheat mode.

Further, when the infrared ray sensor 120 detects that the user does not stand nearby the copy machine 1 and the copy machine 1 is in the standby state for the predetermined period of time after terminating the designated operation, the present accessing is released and the copy machine 1 comes to be in the standby state in order to prevent a situation that a next user directly accesses the computer.

The above-explained various methods for releasing the accessing are also effective in a case where an operation explained below is being performed.

Figure 10:
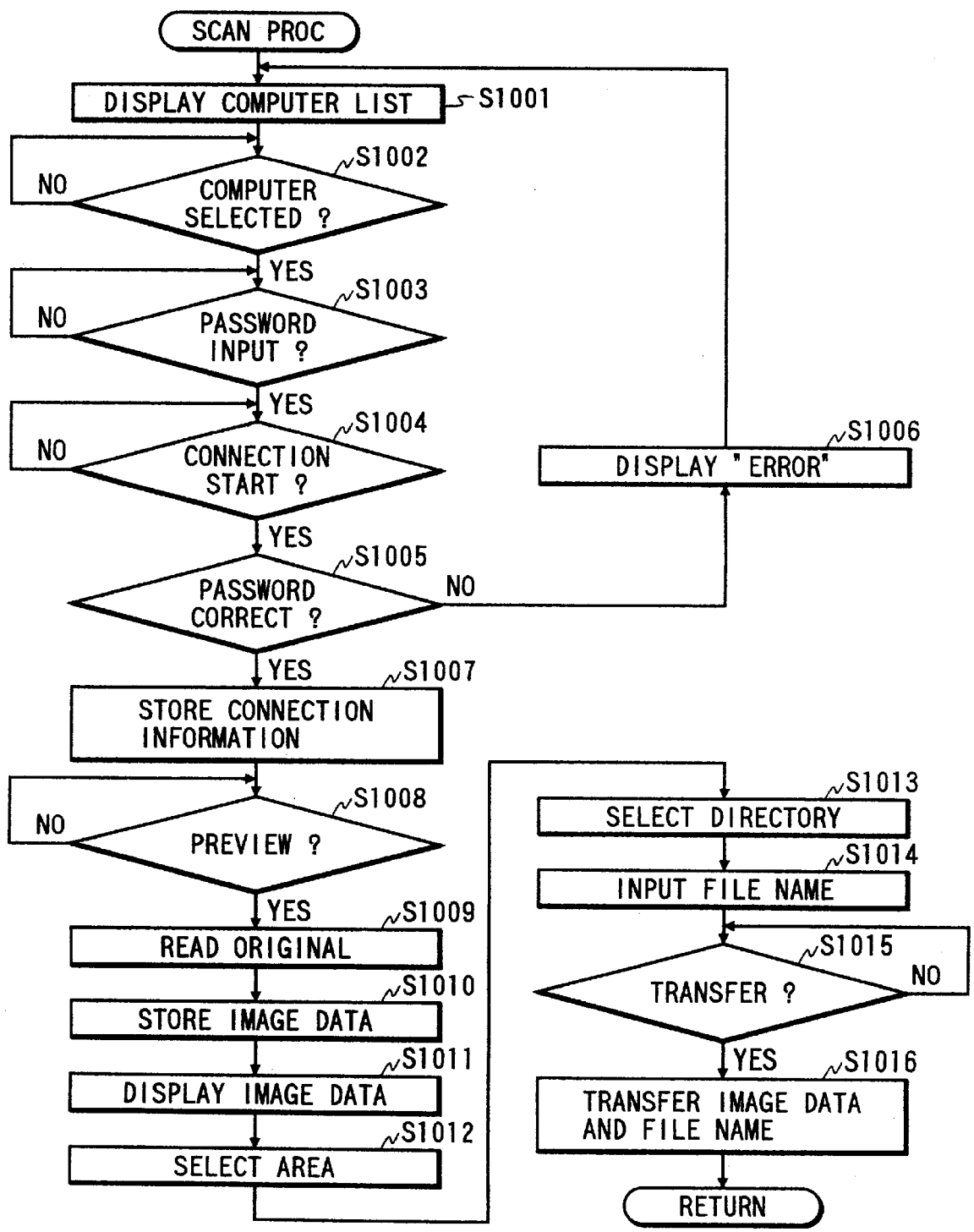
FIG. 10 is a flow chart showing a scan process in the master mode of the copy machine 1.

It will be explained hereinafter a flow of processing in case of depressing the scan button 402 in the step S309 of FIG. 3, on the basis of the flow chart shown in FIG. 10.

When the scan button 402 is depressed in the step S309 of FIG. 3, the displaying of the LCD 109 is changed or switched to that shown in FIG. 7.

In the processing, a procedure for accessing the computer shown in steps S1001 to S1005 is the same as that shown in the previously-explained steps S501 to S505, so that the detailed explanation thereof is omitted.

When the connection with the computer is established by selecting and accessing the computer, same as in the step S507, information concerning the computer to which the connection is established is stored in a step S1007. Then, the flow advances to a step S1008 to switch the displaying of the LCD 109 to that shown in FIG. 11.

Figure 11:
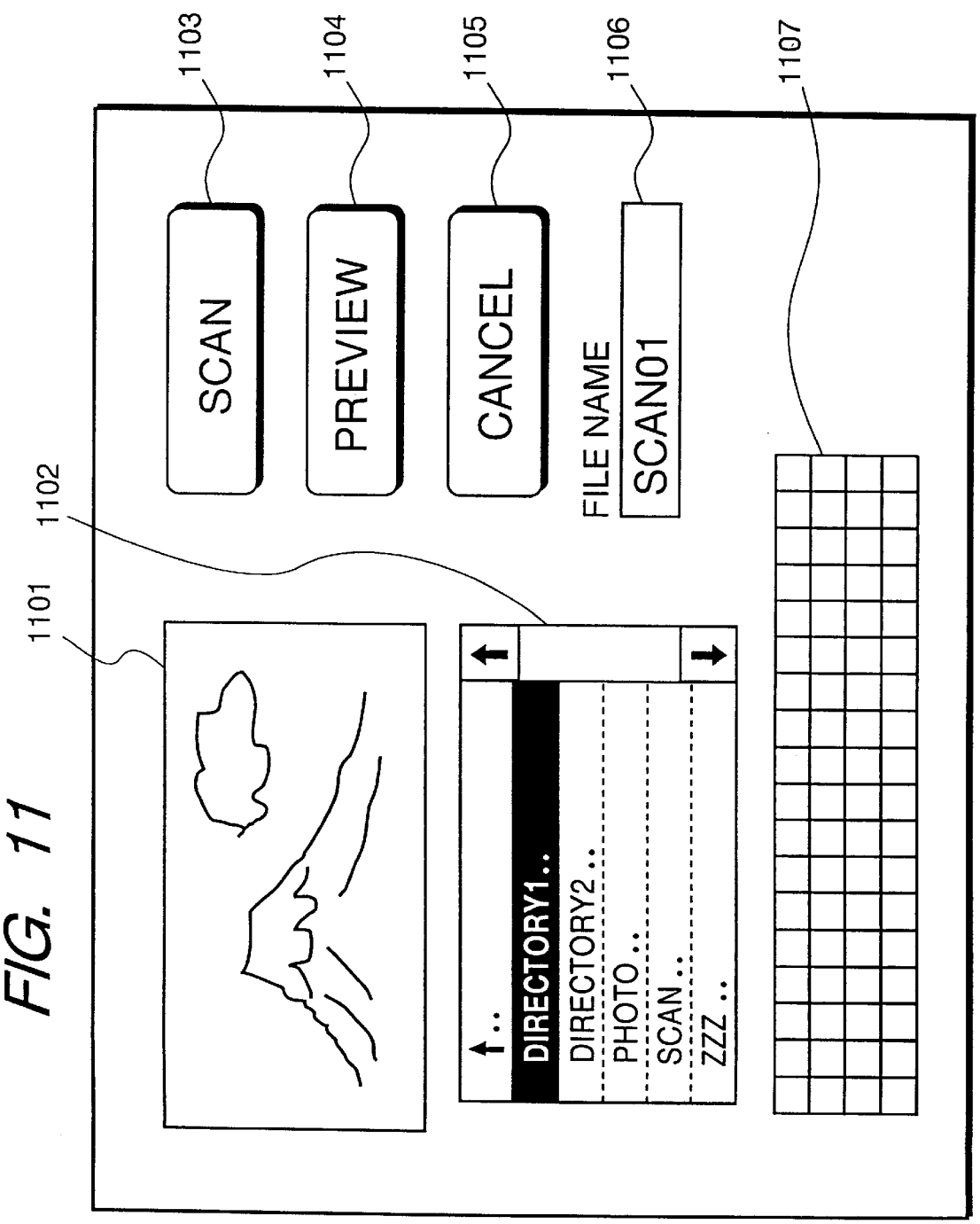
FIG. 11 is a view showing a display image plane in case of the scan process.

In FIG. 11, reference numeral 1101 denotes a preview frame for displaying an image of a read original, reference numeral 1102 denotes a list of directories managed by the accessed computer, reference numeral 1103 denotes a scan button which is used for transferring read image data to the accessed computer, reference numeral 1104 denotes a preview button which is used for displaying the read image in the preview frame, reference numeral 1105 denotes a cancel button which is used for returning the image plane to that shown in FIG. 7 which is used to select the computer, reference numeral 1106 denotes a file name display frame for displaying an input file name, and reference numeral 1107 denotes a character palette which is used for inputting a character and the like.

When the original is placed on the original support plate and the preview button 1104 is depressed in the step S1008, the original placed on the original support plate is read by the scanner 115 in a step S1009. Then, read image data is stored in the image memory 113 in a step S1010 and is displayed on the preview frame 1101 in a step S1011. In a step S1012, if necessary, two points on the preview frame 1101 are designated for trimming a rectangular area of which diagonal line is defined by the designated two points. In this case, address information of the designated or selected area is stored in the RAM 103. In a step S1013, the directory in which the read image data is to be stored is selected by depressing its position in the directory list 1102. Subsequently, the file name used for storing the read image data into the computer is selected from the character palette 1107. The file name input from the character palette 1107 is displayed on the file name display frame 1106 to be able to be confirmed by the user. After these designations and selections terminate, when the scan button 1103 is depressed in a step S1014, the area of the read image data selected in the step S1012 is read from the image memory 113 on the basis of the stored address information, and the read area as well as the input file name is transferred to the accessed computer and stored in the selected directory within a memory of the computer in steps S1015 and S1016.

It will be explained hereinafter a case where the control button 403 is depressed in the step S311 of FIG. 3.

Figure 12:
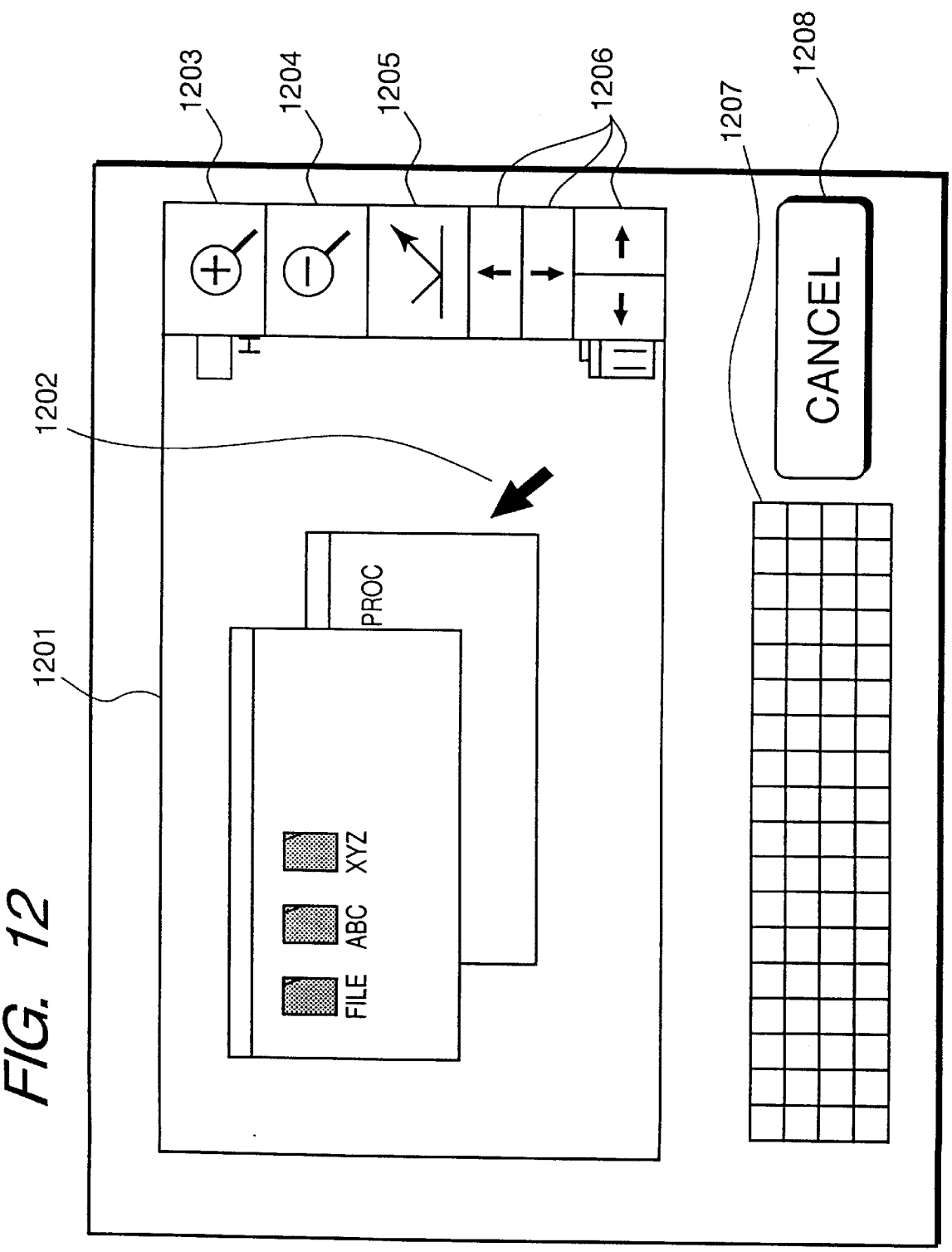
FIG. 12 is a view showing a display image plane in case of a computer control by the copy machine 1.

When the control button 403 is depressed in the step S311 of FIG. 3, the operation image plane of the LCD 109 is changed or switched to the image plane which is used for selecting the computer shown in FIG. 7. The method for selecting the computer is the same as that in the selection operation already explained in the steps S501 to S505 and the steps S1001 to S1005, whereby the detailed explanation thereof is omitted. After the connection is established with the computer by the above method, the LCD 109 switches its displayed image plane to that shown in FIG. 12. In FIG. 12, reference numeral 1201 denotes a computer image plane display frame, reference numeral 1202 denotes an image on the computer, reference numeral 1203 denotes an enlargement icon, reference numeral 1204 denotes a reduction icon, reference numeral 1205 denotes a mouse crick icon, reference numeral 1206 denotes an image plane scroll cursor icon, reference numeral 1207 denotes a character palette used for inputting a character, and reference numeral 1208 denotes a cancel button used for returning the image plane to that shown in FIG. 7.

In FIG. 12, the contents same as those of the image displayed on the image plane of the connected computer are displayed on the computer image plane display frame 1202. However, since a size of the display device of the computer is generally larger than a size of the display device of the copy machine 1, the image to be displayed on the computer image plane display frame 1201 is limited to a part of the image originally displayed by the computer. In order to display other parts which are not essentially displayed on the computer image plane display frame 1201, the user may shift such the not-displayed parts to be within the frame with scrolling the image by the depressing of the image scroll icon 1206. If the user wishes to see the entire image, he may depress the reduction icon 1204 to perform the reduced displaying of the image. Further, if the user wishes to see the detailed portion of the image, he may depress the enlargement icon 1203 to perform the enlarged displaying of the image. In order to use from the copy machine 1 side a pointing device such as a mouse or the like at the computer side, a mouse cursor position can be indicated from the image input device by depressing the inside portion of the computer image plane display frame 1201, and also a mouse crick can be input by using the mouse crick icon 1205. If it is necessary to input the character on the computer, such the character can be input from the character palette 1207. All of these operations which are to change the displaying of the images and perform the character inputs are performed by the CPU 108. That is, the CPU 108 detects the user's operations for the touch panel 111 on the LCD 109 and judges the use's objective operation on the basis of the coordinate values on the touch panel 111.

Figure 13:
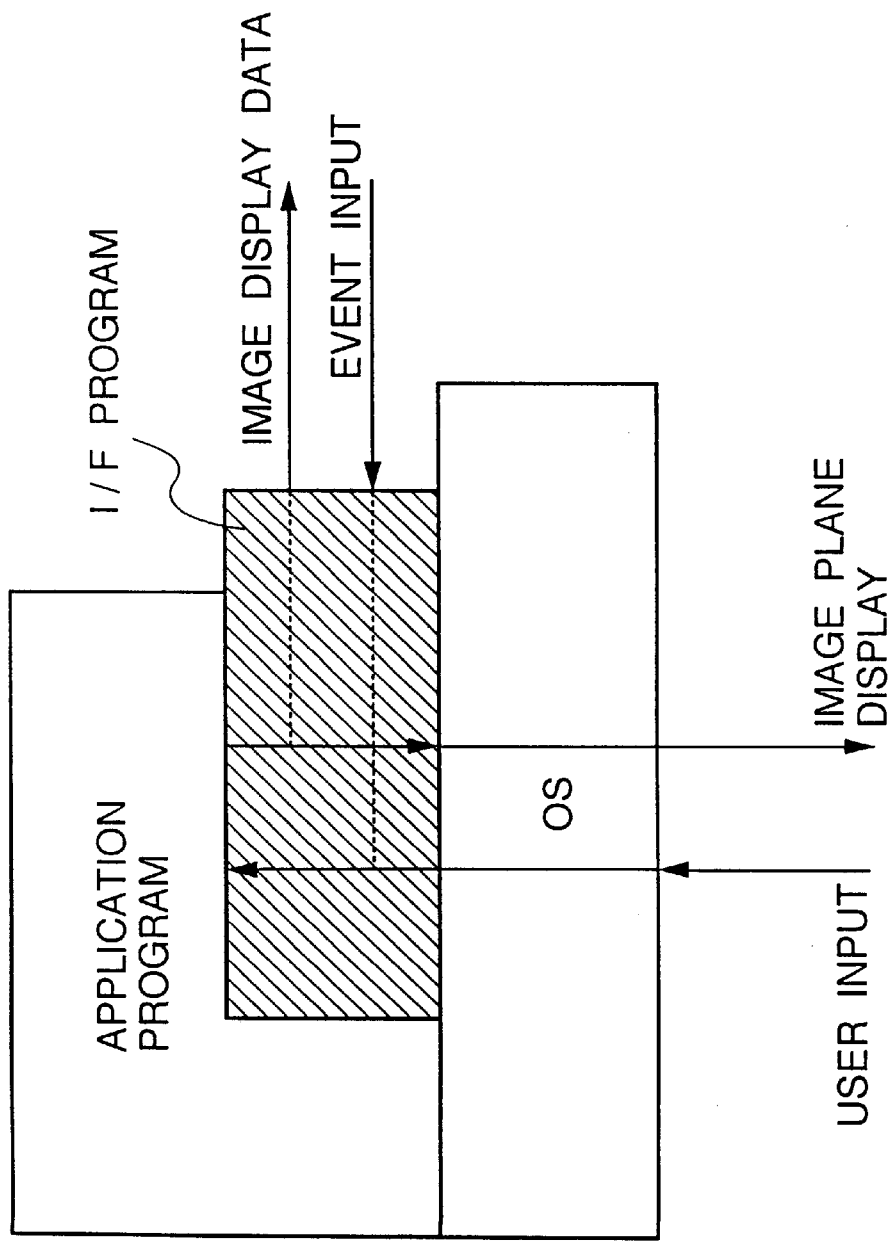
FIG. 13 is a view showing a configuration of an interface program to the copy machine 1 at the computer side.

In a software construction at the computer side, as shown in FIG. 13, there is an interface program for the copy machine 1 between an operating system (OS) and an application program. In a case where the application program transfers the image data to be drawn on the image plane to the OS, the interface program has a function to transfer the same image data to the copy machine 1, and also has a function to input the input operations such as the mouse input and the key input to the application program as well as an event input from the OS.

When the copy machine 1 side receives the image displayed on the computer, the copy machine 1 zooms the received image at a predetermined magnification such that the image can be displayed at a size suitable for the computer image plane display frame 1201. When the enlargement process, the reduction process or the scroll process is instructed by the user, the copy machine 1 converts a base displaying form into a new displaying form and then performs the displaying on the image plane display frame 1201. When the position within the computer image plane display frame 1201 is depressed by the user, the copy machine 1 calculates a relative position with respect to the image presently displayed on the computer and notifies the calculated position to the computer side. At the computer side, the interface program inputs the shift event of mouse cursor to the application program on the basis of the notified coordinate position, to inform the user's operation sent from the copy machine 1. This operation is the same as that with respect to a mouse crick.

It will be explained hereinafter a case where the operation is controlled by using a detachable storage medium such as a PC card, a floppy disk or the like.

In this case, when the connection is to be established with the computer, the PC card or the floppy disk of which contents have previously been set is used. When the remote key is depressed from the operation key 112 in a state where the PC card or the floppy disk is not inserted, it is displayed on the LCD 109 a message for urging the user to insert the PC card or the floppy disk which acts as a key. Then, when the user inserts the PC card or the floppy disk, the CPU 101 confirms the insertion of the storage medium and then accesses the inserted medium to fetch the computer information to be accesses. The computer information includes an address of the computer, as well as an identification code, a password or the like of the user who owns the PC card or the floppy disk. The copy machine 1 comes to be able to establish the connection with the computer by using such the information. The information concerning the plurality of connection destinations can be stored in the same medium as the computer information. When the CPU 101 confirms the storing of the plurality of connection destination information, the CPU 101 provides to the user the list of the connectable computers and requests the user to select the connection destination from among the computers in the list.

On the other hand, the information concerning the computer may not previously be stored in the PC card or the floppy disk, but only the user's information such as the user's identification code, the password and the like may previously be stored in the PC card or the floppy disk. In this case, the PC card or the floppy disk is inserted into the copy machine 1, and then the copy machine 1 specifies the user on the basis of the user's information. Thereafter, when the connection with the computer can be established in the step S505 of FIG. 5 and the step S1005 of FIG. 10, the computer information may be stored in the PC card or the floppy disk in correspondence with the user's information. Further, by referring the past access information of the user in the computer selecting procedure shown in FIG. 14, the list of the computers from among the computers to which the user had accessed can be formed in a designated form, to be presented.

When, the connection destination is designated by the user or there is essentially one connection destination, the CPU 101 intends to connect with the computer via the external interface 118. When the connection is established, the following procedure is the same as that explained above, so that the detailed explanation thereof is omitted. After the connection with the computer is established in the above manner, as explained above, the file in the computer is printed or the computer is operated by the copy machine 1.

Personal information of the computer and the user can be written into the PC card or the floppy disk used in the embodiment, in a manner explained as follows. That is, the user inserts the PC card or the floppy disk into the computer which is ordinarily used by him, and writes his own network connection password into the PC card or the floppy disk by using a data writing program, so that the PC card or the floppy disk to be used as the key in the copy machine 1 can be formed.

As the PC card or the floppy disk used in the embodiment, it can be utilized any medium which can store the computer connection information and is portable by the user. For example, a magnetic card, an IC card, an optical card can be utilized as the storage medium. Further, even a portable terminal can be utilized if an interface specifically used for the portable terminal is provided in the copy machine 1.

In a case where the computer is being accessed in the above manner, in addition to the previously-explained access releasing method, if the PC card 105 or the floppy disk 119 is released from the copy machine 1, the CPU 101 detects it and operates to release the access to the computer.

According to the above-mentioned copy machine 1, the desired computer can be accessed from the copy machine 1 side, and the image data of the file managed by the accessed computer can be fetched to be printed out. Further, since the printing can be performed after the preview operation, it can effectively be prevented that erroneous image data is printed out. Furthermore, since the accessing to the computer is allowed by inputting the password or inserting the storage medium including the password, a user's secret can effectively be protected. Furthermore, the accessing to the computer can immediately be released by the user's instruction.

Further, even if the user forgets to instruct the releasing of the accessing, the accessing can automatically be released by means of a predetermined timer. Therefore, since it can effectively be prevented that the computer accessing state is undesirably maintained due to the user's error, the user's secret can effectively be protected.

Furthermore, since the infrared ray sensor detects that there is no user nearby the copy machine, the accessing can automatically be released.

Furthermore, in the case where the accessing to the computer is performed by using the storage medium which stores the connection information, since the storage medium can be considered as the key, the accessing can be released by removing the storage medium (i.e., the key), so that the user's secret can effectively be protected.

Furthermore, the operation can be performed by selecting either one of the slave mode and the master mode, if necessary.

Furthermore, since the original can be read in response to the instruction from the copy machine 1 and then transferred, the read image data can effectively be stored in the desired computer. In this case, the file name can be input in the desired computer in response to the instruction from the copy machine 1.

Furthermore, the desired computer operation can be performed from the copy machine 1.

Furthermore, in the case where the desired computer is accessed from the copy machine 1 side, the user can easily select the computer which is often utilized by him, by providing to the user the list of the limited computers which has been past accessed by the user.

Furthermore, in the case where the computer is accessed by using the storage medium which stores the user's information, the user can easily select the computer by providing based on the user's information in the storage medium to the user the list of the computers which are to be exclusively accessed by such the user.

Furthermore, the data representing the program for controlling the above-mentioned operations can be stored in the detachable storage medium such as a magneto-optical disk or the like, and then the stored data can be read to be applied to other controllable devices.

As explained above, according to the present invention, the digital copy machine can effectively be utilized by connecting it to the network such as the LAN.

It should be understood that the present invention is not limited to the embodiment as set forth above and may be variously changed and modified within the scope of the invention defined in the attached claims.

What is claimed is:

1. A printing apparatus comprising:
   a connector, arranged to connect said apparatus to a computer network to which a plurality of computers are connected, and to connect the plurality of computers to the computer network;
   a display unit, arranged to display a preview image based on image data stored in a computer connected to the computer network via said connector;
   a printing unit, arranged to print an image based on the image data stored in the computer;
   a first receiver, arranged to receive from the computer the image data for the preview image to be displayed by said display unit; and
   a second receiver, arranged to receive the image data to be printed by said printing unit,
   wherein said first receiver and said second receiver individually receive the image data for the preview image to be displayed and the image data to be printed, respectively, and
   wherein said display unit and said printing unit are connected to each other not through said connector.

2. A printing apparatus according to claim 1, wherein said display unit displays a list of files stored in the computer, and said first and second receivers receive image data of a file in the list of files displayed by said display unit.

3. A printing apparatus according to claim 2, wherein said display unit displays a list of the plurality of computers connected to the computer network via said connector in advance of displaying the list of files stored in the computer, and displays a list of files stored in a computer designated from the list of the plurality of computers.

4. A printing apparatus comprising:

a connector, arranged to connect said apparatus to a computer network to which a plurality of computers are connected, and to connect the plurality of computers to the computer network;

an access unit, arranged to access a computer connected to the computer network via said connector;

a printing unit, arranged to print an image based on image data sent from the computer accessed by said access unit, in accordance with a request;

a release unit, arranged to release a computer accessed by said access unit in accordance with a predetermined condition; and a setting unit, arranged to set an ID card for identifying a user, wherein said release unit releases a computer accessed by said access unit in a case where the ID card is removed from said setting unit.

5. A printing apparatus comprising:

a connector, arranged to connect said apparatus to a computer network to which a plurality of computers are connected, and to connect the plurality of computers to the computer network;

an access unit, arranged to access a computer connected to the computer network via said connector;

a printing unit, arranged to print an image based on image data sent from the computer accessed by said access unit, in accordance with a request; and a release unit, arranged to release a computer accessed by said access unit in accordance with a predetermined condition, wherein said release unit releases a computer accessed by said access unit in accordance with a release instruction.

6. A printing apparatus according to claim 5, further comprising a display unit, arranged to display a list of computers to be accessed by said access unit.

7. A printing apparatus according to claim 6, wherein said display unit displays an access history of said access unit.

8. A printing apparatus according to claim 6, wherein said display unit changes a display mode of the list in accordance with a designation made by a user.

9. A printing apparatus comprising:

a connector, arranged to connect said apparatus to a computer network to which a plurality of computers are connected, and to connect the plurality of computers to the computer network;

an access unit, arranged to access a computer connected to the computer network via said connector;

a printing unit, arranged to print an image based on image data sent from the computer accessed by said access unit, in accordance with a request; and a release unit, arranged to release a computer accessed by said access unit in accordance with a predetermined condition, wherein said release unit releases a computer accessed by said access unit in a case where said apparatus sets a preheat mode.

10. A printing apparatus according to claim 9, further comprising a display unit, arranged to display a list of computers to be accessed by said access unit.

11. A printing apparatus according to claim 10, wherein said display unit displays an access history of said access unit.

12. A printing apparatus according to claim 10, wherein said display unit changes a display mode of the list in accordance with a designation made by a user.

13. A printing apparatus according to claim 4, further comprising a display unit, arranged to display a list of computers to be accessed by said access unit.

14. A printing apparatus according to claim 13, wherein said display unit displays an access history of said access unit.

15. A printing apparatus comprising:

a connector, arranged to connect said apparatus to a computer network to which a plurality of computers are connected, and to connect the plurality of computers to the computer network;

an access unit, arranged to access a computer connected to the computer network via said connector;

a printing unit, arranged to print an image based on image data sent from the computer accessed by said access unit, in accordance with a request;

a release unit, arranged to release a computer accessed by said access unit in accordance with a predetermined condition; and a display unit, arranged to display a list of computers to be accessed by said access unit, wherein said display unit changes a display mode of the list in accordance with a designation made by a user.

16. A printing apparatus according to claim 15, further comprising a setting unit, arranged to set an ID card identifying a user, wherein said release unit releases a computer accessed by said access unit in a case where the ID card is removed from said setting unit.

17. A printing apparatus according to claim 15, wherein said release unit releases a computer accessed by said access unit in accordance with a release instruction.

18. A printing apparatus according to claim 15, wherein said release unit releases a computer accessed by said access unit in a case where said apparatus sets a preheat mode.

19. A printing apparatus according to claim 15, wherein said display unit displays an access history of said access unit.

20. A printing apparatus comprising:

a connector, arranged to connect said apparatus to a computer network to which a plurality of computers are connected, and to connect the plurality of computers to the computer network;

a printing unit, arranged to print an image based on image data sent from any of the plurality of computers via said connector;

an input unit, arranged to input information for specifying a computer connected via said connector and information for specifying a file stored in the computer;

an instruction unit, arranged to instruct the computer to send the file based on the information inputted by said input unit; and a controller, arranged to control said printing unit to print the image based on the file sent from the computer in accordance with a instruction by said instruction unit.

21. A printing apparatus according to claim 20, further comprising a display unit, arranged to display a list of the plurality of computers connected via said connector and the file stored in the computer,
  wherein said input unit inputs, in accordance with a manual operation, the information for specifying the computer and the filed based on information displayed by said display unit.

22. A printing apparatus according to claim 20, wherein said input unit inputs the information for specifying the computer and then inputs the information for specifying the file stored in the computer.

23. A printing apparatus according to claim 20, wherein said printing unit prints the image in accordance with a print order sent with the image data from a computer connected via said connector.

24. A printing method of a printing apparatus, said method comprising:
  a connection step of connecting the apparatus to a computer network to which a plurality of computers are connected;
  a display step of displaying a preview image based on image data stored in a computer connected to the computer network using a display unit;
  a printing step of printing an image based on the image data stored in the computer using a printing unit which is connected to the display unit not through the computer network;
  a first reception step of receiving from the computer the image data for the preview image to be displayed in said display step; and
  a second reception step of receiving the image data to be printed in said printing step,
  wherein said first reception step and said second reception step individually receive the image data for the preview image to be displayed and the image data to be printed, respectively.

25. A computer-readable storage medium storing a computer program for implementing a printing method of a printing apparatus, the apparatus being connected to a computer network to which a plurality of computers are connected, the program comprising:
  program code of a display step of causing to be displayed a preview image based on image data stored in a computer connected to the computer network using a display unit;
  program code of a printing step of causing to be printed an image based on the image data stored in the computer using a printing unit which is connected to the display unit not through the computer network;
  program code of a first reception step of causing to be received from the computer the image data for the preview image to be displayed in the display step; and
  program code of a second reception step of causing to be received the image data to be printed in the printing step,
  wherein the first reception step and the second reception step individually receive the image data for the preview image to be displayed and the image data to be printed, respectively.

26. A printing method of a printing apparatus, said method comprising:
  a connection step of connecting the apparatus to a computer network to which a plurality of computers are connected;
  a printing step of printing an image based on image data sent from any of the plurality of computers connected to the computer network;
  an input step of inputting information for specifying a computer connected to the computer network and information for specifying a file stored in the computer;
  an instruction step of instructing the computer to send the file based on the information inputted in said input step; and
  a control step of controlling said printing step to print the image based on the file sent from the computer, in accordance with a instruction in said instruction step.

27. A computer-readable storage medium storing a computer program for implementing a printing method of a printing apparatus, the apparatus being connected to a computer network to which a plurality of computers are connected, the program comprising:
  program code of a printing step of causing to be printed an image based on image data sent from any of the plurality of computers connected to the computer network;
  program code of an input step of causing to be inputted information for specifying a computer connected to the computer network and information for specifying a file stored in the computer;
  program code of an instruction step of causing the computer to be instructed to send the file based on the information inputted in the input step; and
  program code of a control step of causing the printing step to be controlled to print the image based on the file sent from the computer, in accordance with a instruction in the instruction step.

28. A printing method of a printing apparatus, said method comprising:
  a connection step of connecting the apparatus to a computer network to which a plurality of computers are connected, and connecting the plurality of computers to the computer network;
  an access step of accessing a computer connected to the computer network in said connection step;
  a printing step of printing an image based on image data sent from the computer accessed in said access step, in accordance with a request;
  a release step of releasing a computer accessed in said access step in accordance with a predetermined condition; and
  a setting step of setting an ID card in a setting unit for identifying a user,
  wherein said release step releases a computer accessed in said access step in a case where the ID card is removed from the setting unit.

29. A printing method of a printing apparatus, said method comprising:
  a connection step of connecting the apparatus to a computer network to which a plurality of computers are connected, and connecting the plurality of computers to the computer network;
  an access step of accessing a computer connected to the computer network in said connection step;
  a printing step of printing an image based on image data sent from the computer accessed in said access step, in accordance with a request; and
  a release step of releasing a computer accessed in said access unit in accordance with a predetermined condition,
  wherein said release step releases a computer accessed in said access step in accordance with a release instruction.

30. A printing method of a printing apparatus, said method comprising:
- a connection step of connecting the apparatus to a computer network to which a plurality of computers are connected, and connecting the plurality of computers to the computer network;
- an access step of accessing a computer connected to the computer network in said connection step;
- a printing step of printing an image based on image data sent from the computer accessed in said access step, in accordance with a request; and
- a release step of releasing a computer accessed in said access step in accordance with a predetermined condition,
- wherein said release step releases a computer accessed in said access step in a case where the apparatus sets a preheat mode.

31. A printing method of a printing apparatus, said method comprising:
- a connection step of connecting the apparatus to a computer network to which a plurality of computers are connected, and connecting the plurality of computers to the computer network;
- an access step of accessing a computer connected to the computer network in said connection step;
- a printing step of printing an image based on image data sent from the computer accessed in said access step, in accordance with a request;
- a release step of releasing a computer accessed in said access step in accordance with a predetermined condition; and
- a display step of displaying a list of computers to be accessed in said access step,
- wherein said display step changes a display mode of the list in accordance with a designation made by a user.

32. A computer program for implementing a printing method of a printing apparatus, said program comprising:
- program code of a connection step of connecting the apparatus to a computer network to which a plurality of computers are connected, and connecting the plurality of computers to the computer network;
- program code of an access step of accessing a computer connected to the computer network in the connection step;
- program code of a printing step of printing an image based on image data sent from the computer accessed in the access step, in accordance with a request;
- program code of a release step of releasing a computer accessed in the access step in accordance with a predetermined condition; and
- program code of a setting step of setting an ID card in a setting unit for identifying a user,
- wherein the release step releases a computer accessed in the access step in a case where the ID card is removed from the setting unit.

33. A computer program for implementing a printing method of a printing apparatus, said program comprising:
- program code of a connection step of connecting the apparatus to a computer network to which a plurality of computers are connected, and connecting the plurality of computers to the computer network;
- program code of an access step of accessing a computer connected to the computer network in the connection step;
- program code of a printing step of printing an image based on image data sent from the computer accessed in the access step, in accordance with a request; and
- program code of a release step of releasing a computer accessed in the access unit in accordance with a predetermined condition,
- wherein the release step releases a computer accessed in the access step in accordance with a release instruction.

34. A computer program for implementing a printing method of a printing apparatus, said program comprising:
- program code of a connection step of connecting the apparatus to a computer network to which a plurality of computers are connected, and connecting the plurality of computers to the computer network;
- program code of an access step of accessing a computer connected to the computer network in the connection step;
- program code of a printing step of printing an image based on image data sent from the computer accessed in the access step, in accordance with a request; and
- program code of a release step of releasing a computer accessed in the access step in accordance with a predetermined condition,
- wherein the release step releases a computer accessed in the access step in a case where the apparatus sets a preheat mode.

35. A computer program for implementing a printing method of a printing apparatus, said program comprising:
- program code of a connection step of connecting the apparatus to a computer network to which a plurality of computers are connected, and connecting the plurality of computers to the computer network;
- program code of an access step of accessing a computer connected to the computer network in the connection step;
- program code of a printing step of printing an image based on image data sent from the computer accessed in the access step, in accordance with a request;
- program code of a release step of releasing a computer accessed in the access step in accordance with a predetermined condition; and
- program code of a display step of displaying a list of computers to be accessed in the access step,
- wherein the display step changes a display mode of the list in accordance with a designation made by a user.

* * * * *

UNITED STATES PATENT AND TRADEMARK OFFICE
CERTIFICATE OF CORRECTION

PATENT NO. : 6,433,883 B1
DATED : August 13, 2002
INVENTOR(S) : Koji Kajita

It is certified that error appears in the above-identified patent and that said Letters Patent is hereby corrected as shown below:

<u>Title page,</u>
Insert -- [*] Notice: This patent issued on a continued prosecution application filed under 37 CFR 1.53(d), and is subject to the twenty year patent term provisions of 35 U.S.C. 154(a)(2). --.

Item [56], References Cited, FOREIGN PATENT DOCUMENTS, "WO 9317379" should read -- 9317379 --.
Item [57], ABSTRACT,
Line 15, "output" should read -- outputs --.

<u>Column 1,</u>
Lines 40 and 47, "case" should read -- a case --.
Line 53, "obtain" should read -- conveniently obtain --.

<u>Column 2,</u>
Lines 33 and 35, "case" should read -- a case --.

<u>Column 3,</u>
Line 59, "case" should read -- a case --.

<u>Column 4,</u>
Lines 18, 20, 28, 30, 31 and 33, "another" should read -- other --.
Line 57, "returns-to" should read -- returns to --.

<u>Column 5,</u>
Line 31, "may" should read -- may be --.
Line 53, "RM" should read -- ROM --.

<u>Column 6,</u>
Line 53, "then a" should read -- then the --.

<u>Column 7,</u>
Line 11, "are the" should read -- are --.
Line 17, "start the" should read -- start, the --.

<u>Column 8,</u>
Line 11, "an other" should read -- another --.

<u>Column 9,</u>
Line 56, "such the" should read -- such --.

UNITED STATES PATENT AND TRADEMARK OFFICE
CERTIFICATE OF CORRECTION

PATENT NO. : 6,433,883 B1
DATED : August 13, 2002
INVENTOR(S) : Koji Kajita

It is certified that error appears in the above-identified patent and that said Letters Patent is hereby corrected as shown below:

Column 10,
Line 2, "such the" should read -- such --.
Line 52, "accesses." shoud read -- accessed. --.
Line 55, "comes to be" should read -- becomes --.
Line 56, "such the" should read -- such --.

Column 11,
Line 13, "accessed" should read -- access --.
Line 15, "When," should read -- When --.

Column 12,
Line 27, "such the" should read -- such --.

Column 14,
Line 65, "a instruction" should read -- an instruction --.

Column 15,
Line 5, "filed" should read -- file --.

Column 16,
Lines 9 and 29, "a instruction" should read -- an instruction --.

Signed and Sealed this

Twenty-fifth Day of February, 2003

JAMES E. ROGAN
*Director of the United States Patent and Trademark Office*